United States Patent
Calderini et al.

[11] Patent Number: 5,876,642
[45] Date of Patent: Mar. 2, 1999

[54] PROCESS FOR MAKING A MOLD FOR THE MANUFACTURE OF MICROLENSES

[75] Inventors: Pierre V. Calderini, Montigny Sur Loing; Thierry L. A. Dannoux, Avon, both of France

[73] Assignee: Corning Incorporated, Corning, N.Y.

[21] Appl. No.: 594,577

[22] Filed: Jan. 31, 1996

[30] Foreign Application Priority Data

Mar. 15, 1995 [FR] France .................................. 95 02983

[51] Int. Cl.[6] .................................................... B29D 11/00
[52] U.S. Cl. .............................. 264/2.5; 216/24; 216/26; 264/1.1
[58] Field of Search .............................. 264/2.5, 2.7, 1.1; 216/24, 26

[56] References Cited

U.S. PATENT DOCUMENTS

| 5,300,263 | 4/1994 | Hoopman et al. | 264/2.5 |
| 5,575,962 | 11/1996 | Takahashi | 264/2.5 |

FOREIGN PATENT DOCUMENTS

| 2189861 | 1/1974 | France . |
| 2510768 | 2/1983 | France . |
| 60-108573 | 5/1985 | Japan . |
| 5-47172 | 2/1993 | Japan . |
| 5-299569 | 11/1993 | Japan . |
| 2 264 890 | 9/1993 | United Kingdom . |

OTHER PUBLICATIONS

D. Daly, R.F. Stevens, M.C. Hutley, N. Davies, "The manufacture of microlenses by melting photoresist", Measurement of Science and Technology, Aug. 1, 1990, No. 8, Bristol, GB, pp. 759–766.

Primary Examiner—Mathieu D. Vargot
Attorney, Agent, or Firm—Robert L. Carlson

[57] ABSTRACT

Preferential etching techniques are used to form a mold which can then be used to mold a microlens array. A mask ($4_i$) made of a material which is resistant to a chemical composition for etching the plate is formed on a substrate, so that the mask is in the form of a grid with generally polygonal meshes each centered over one of the desired cells. The sides of each cell of the mask has outgrowths ($5_j$) extending towards the center of desired cells. The substrate is subjected to the etching composition.

10 Claims, 1 Drawing Sheet

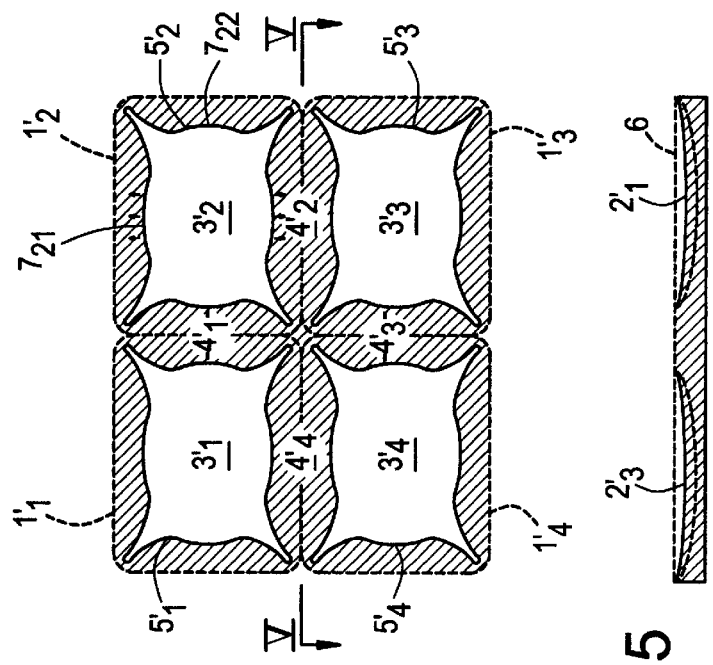
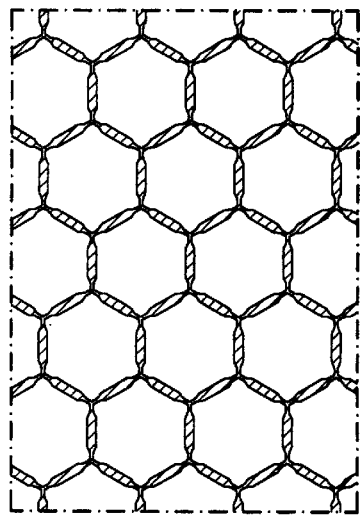
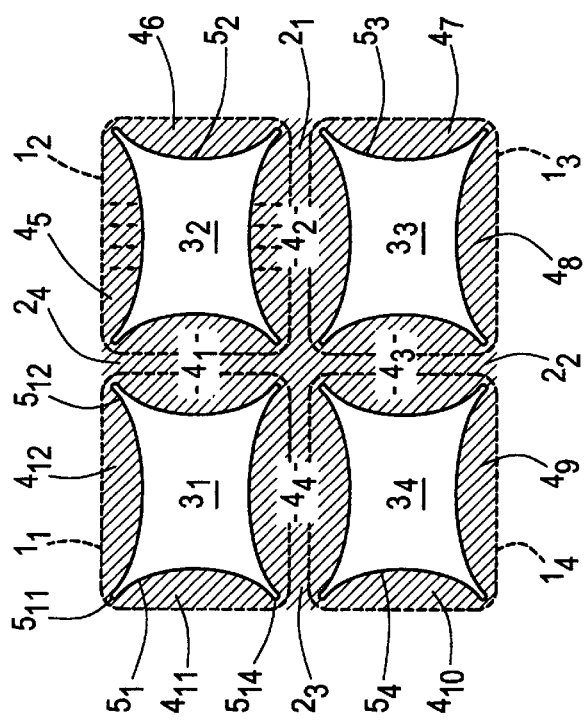
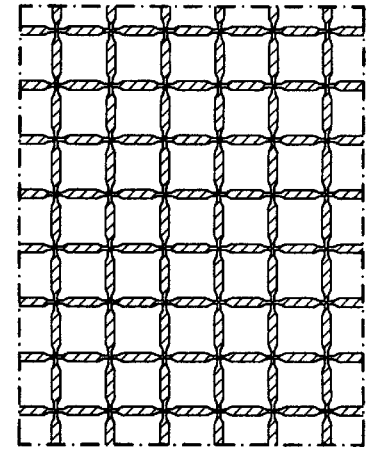

PROCESS FOR MAKING A MOLD FOR THE MANUFACTURE OF MICROLENSES

FIELD OF THE INVENTION

The present invention relates to a process for manufacturing a mold for making microlens arrays, wherein the mold consists of a periodic network of mold cells on the surface of a plate.

BACKGROUND OF THE INVENTION

French Patent Application No. 9408420, filed Jul. 7, 1994, which corresponds to U.S. patent application Ser. No. 08/497,380, filed Jun. 29, 1995, now U.S. Pat. No. 5,623,368 describes a process for manufacturing a network of microlenses using a mold. In this process the cells of the mold have a depth greater than the depth of the convex part of the microlenses which are formed. Under the effect of the pressure exerted on the plate, the deformable optical material projects into the cells, taking on the convex shape of convex microlenses, without the convex surfaces of these microlenses coming into contact with the bottom of the cells, thereby preserving the optical finish of these convex surfaces.

The networks of microlenses thus obtained have various applications, particularly in image sensors or reproducers and in particular in video image projectors operating by projecting light through a two-dimensional matrix of cells with liquid crystals displaying the image to be projected. The luminous efficiency of such projectors is improved by focusing the light from a source on the useful areas of the cells, which is obtained by a network of microlenses. It is therefore appropriate for the opening of these lenses to be as large as possible, in order to allow the maximum amount of light to pass through. For this purpose, the cells hollowed in the mold, on the surface of the mold, have polygonal forms which are closely imbricated with respect to one another and not less compact circular forms of imbrication.

Mechanical machining and reactive ion etching methods have been used heretofore to form molds having circular mold cavities for making microlens arrays.

The present invention, on the other hand, deals with the forming of molds having generally polygonal mold cell shapes, preferably using chemical etching techniques. In the manufacture of such a mold by chemical etching through a mask which conforms to the network of cells to be formed, one observes that the smaller the dimensions of the cells, the more difficult it is to obtain cells which open on the surface of the mold with the anticipated polygonal contour: square, rectangular, pentagonal, hexagonal, etc. In particular, one typically observes a rounding of what would otherwise be rectilinear sides of the polygonal cell, resulting in a more circular, rather than polygonal, shape of the opening of the cell on the plate, thereby reducing the opening of the microlenses which are formed. This phenomenon is particularly perceptible in the case of microlenses which are less than 100 μm in diameter.

The present invention therefore aims to provide a process for manufacturing a mold consisting of a periodic network of mold cells on the surface of a plate, the cells having generally polygonal shapes defined by generally rectilinear cell side boundary contours.

Another problem which occurs in pressing lenses from polygonal mold cells is that the convex surfaces of the microlenses formed can deviate from the desired sphericity because the optical material is being pressed into a mold having other than a circular shape. The present invention therefore also aims to improve the sphericity of the optical surfaces of microlenses obtained by pressing a deformable optical material against a network of cells having generally polygonal edges.

SUMMARY OF THE INVENTION

One aspect of the present invention relates to a process for manufacturing a mold, consisting of a network of cells on the surface of a plate, which can be used to form microlens arrays. In the present invention, a mask is first applied to a substrate plate. The mask is made of material which is resistant to a chemical composition for etching said plate, and preferably is in the form of a grid with generally polygonal meshes, each centered over one of the cells to be hollowed in the plate by etching. The plate is then exposed to the etching composition, this process being distinguished by the fact that the mask exposes, in each mesh, an unmasked area of the plate which has outgrowths extending towards the center of the mold cell (the opening of the meshes).

As will be seen below, these outgrowths allow one to regularize the width of the boundaries which, after etching, separate the cells from one another in the plane of the surface of the mask, including in the vicinity of the summits of the polygonal contours of the cells. One thus reduces the extent of the nonoptical surfaces on a network of microlenses obtained by pressing against the mold thus manufactured, and one likewise increases the quantity of light transmitted by the network. Thus, the present invention allows one to compensate for the preferential etching which occurs in the desired rectilinear sides which define each desired polygonal mold cell.

In another embodiment of the invention, one subjects the mold cell substrate to the etching composition until the etching of the masked areas of the plate establishes common boundaries between cells which each have a incurved profile extending under the plane of the surface of the substrate, this profile being generally conforming to the intersection of two adjacent cells with roughly spherical surfaces. Using a mold of this nature to form microlenses improves on the sphericity of the resultant microlenses produced.

BRIEF DESCRIPTION OF THE DRAWINGS

FIG. 1 is an enlarged top view of a part of a mask and of a plate supporting this mask, which are used in implementation of the process according to the invention.

FIGS. 2 and 3 are top views of other embodiments of masks for implementation of this process, FIG. 4 is a top view similar to that of FIG. 1, illustrating a variant of the process according to the invention.

FIG. 5 is a cross section along line V of FIG. 4.

DETAILED DESCRIPTION OF THE INVENTION

FIG. 1 illustrates a very enlarged top view of a part of a mask designed for making a mold in accordance with the present invention, which mold can then be utilized to mold a microlens array. This mask is formed by selective deposition of a layer of a photosensitive resin on a metallic plate, for example, by exposure of the layer to an image in accordance with the pattern of the mask to be obtained, and then stripping the layer in order to make the insulated or uninsulated areas disappear, depending on whether the resin is of the positive or negative type, respectively.

FIG. 1 illustrates the use of a mask to preferentially etch portions of a substrate to arrive at a desired mold cell pattern. The objective is to obtain lens molding cells having contours $1_1, 1_2, 1_3, 1_4, \ldots$ which are polygonal, each very close to a rectangle, so that the cells obtained after etching are separated from one another by boundaries $2_1, 2_2, 2_3, 2_4, \ldots$ of constant width. By etching the mold cell areas $3_1, 3_2, 3_3, 3_4$ deeper than the desired sag of the microlenses to be formed, and using such a mold to form the microlens arrays, contact of the optical surfaces of the microlenses with the mold surface is minimized. For the clarity of FIG. 1, only four contiguous and imbricated cells have been illustrated. Unmasked areas $3_1, 3_2, 3_3, 3_4$ of the substrate are defined by masked areas $4_j$ (j from 1 to 12), with it understood that peripheral areas $4_5$ to $4_{12}$ all have an area (not shown) adjacent them which is symmetrical with respect to the boundary which it runs along.

All the masked areas thus take on the appearance of a grid with generally polygonal meshes, the grids $4_i$ of which are generally rectilinear and centered on the desired boundaries $2_i$ which will define the mold cells. The shape of the desired cell contours $1_i$ thus correspond closely to the boundaries $2_i$. Each of unmasked areas $3_i$ is concentric with respect to the desired cell contour $1_i$ to be formed in the substrate.

According to the invention, each unmasked area of contour $5_i$ has outgrowth portions (.e.g. $5_3, 5_4$) along the rectilinear sections of the contour 5. These outgrowth portions extend outwardly from the desired cell contour 1 towards the center of the desired mold cell to be formed.

In contrast, if the contour $5_i$ of an unmasked area was exactly rectangular, and one attempted to produce, by chemical etching, cells of small dimensions, on the order of 100 μm or less, the final contour of the cells obtained would diverge from the desired contour $1_i$ in that the corners would be much more rounded and inside the ideal contour $1_i$ than desired. Consequently, microlenses formed by pressing against such cells would have a less extended optical surface, and therefore less of an opening offered for the passage of the light.

Shaping the mask 4 in the manner illustrated in FIGS. 1–4 lessens the effect of the etching solution in the corners of the unmasked areas. This can be explained with reference to an example in which the plate to be etched is metallic, made of Inconel 600, for example, the etching solution consisting of a solution of $FeCl_3$ and nitric acid.

The chemical reaction which occurs during etching is exothermic. It is believed that, in the corners of a masked area, the removal of the heat formed is more rapid because of the proximity of the metal which surrounds these corners. Since the temperature of the solution is lower in these corners, the reaction speed is also slower.

Furthermore, it is believed that the solution becomes depleted more quickly in the corners, the mixing of the etching solution being reduced, hindered by the acute angular contour of the unmasked area in this location.

These two phenomena combine to slow down the etching in the corners of the cells, which progresses under the masked parts towards contours $1_i$. The rectilinear parts of contour $1_i$ being reached first by the etching solution, the attack of the corner regions is less advanced, and if one then stops the etching, the contour of the hollowed cells remains far from the ideal contour $1_i$ in the regions of the angles.

According to the invention, this phenomenon is fought against by giving contour $5_i$ of the unmasked areas the form represented in FIG. 1, this contour having opening areas (e.g. $5_{11}$) in the corners which allow the etching solution to penetrate more quickly and deeply into the corners towards final contour $1_i$ which is to be obtained. As represented in the cell with contour $1_2$, the etching front progresses underneath mask 4 in the direction of the arrows towards the final contour. This progress is more rapid in areas corresponding to the desired rectilinear side portions of the contour than in the corners. In contrast, since the distance separating starting contour $5_2$ from desired contour $1_2$ is less in the corners, the less rapid etching is compensated for by the reduction of the distance to be covered.

Thus, it has been possible to produce, thanks to the invention, an etched plate made of Inconel 600 of a network of imbricated cells with rectangular contour $1_i$ having a space requirement of 35 μm×54 μm and 8 μpm deep. Thanks to the mold thus produced, it is possible to form, by pressing of a glass plate such as 7059 glass of Corning Incorporated, a highly accurate network of cells of a few μm with a convex sag, whose optical surfaces do not come into contact with the bottom of the cells. The finish of the optical surface is thus preserved. Furthermore, according to the present invention, the size of this optical surface is maximized because it extends as far as the desired contour $1_i$ of FIG. 1.

In FIG. 1, each unmasked area contour $5_i$, in the vicinity of the corners of the desired contour $1_i$, has an evolving profile consisting of a roughly straight portion (e.g. $5_{12}$) which connects the corner area with the outermost regions (e.g. $5_4$) of the outgrowth $5_j$. At the other end of the roughly straight portion, in the area corresponding to the corner (e.g. $5_{11}$), each contour 5 is defined by a profile having a predetermined radius of curvature r. By providing an opening of sufficient width 2r in this corner region, etching of the corner region is greatly facilitated. Tests have shown that for cells 35 μm×54 μm such as those mentioned above, a radius r=1 μm is suitable.

Each of the grids that make up masked areas $4_i$, which separate the unmasked areas, thus have a maximum width at mid-length and a minimum width at their ends. As an illustrative and nonlimiting example, the minimum width can be reduced by approximately two-thirds with respect to the maximum width. As an illustrative example only, the evolving profile connecting a roughly rectilinear edge of contour $5_i$ with the end of an outgrowth can have an average radius of curvature R (corresponding to the areas such as, for example, $5_4$), with respect to width I of a cell, such that:

0.25<R/I<0.5 for cells having a width between approximately 20 and 100 μm.

Of course, mold cell networks having other than rectangular shapes could also be produced using the process according to the invention. Thus, one could produce networks of square or hexagonal cells with masks according to the present invention, configured, for example, as represented in FIGS. 2 and 3, respectively. Networks of cells with shapes other than those represented, pentagonal or octagonal, for example, could also be produced.

In still other embodiments of the present invention, illustrated in FIGS. 4 and 5, the boundaries separating the cells are given curved profiles $2'_1, 2'_3$ which are developed in the plane of starting surface 6 of the plate in which one etches the cells, and in a plane perpendicular to this surface 6. In these figures, reference numerals, assigned a "prime" sign, which are identical to the reference numerals used in FIG. 1, indicate identical or similar elements.

It is known that the intersection of two spherical surfaces can form a circle. By giving two contiguous cells a boundary with a recessed profile which is close to the spherical, one brings the intersection of the surfaces of two adjacent microlenses which are formed by pressing, closer to that of two spherical surfaces. It is understood that the sphericity of the optical surfaces of the microlenses thus formed is improved, as is their optical quality.

To accomplish this, the mask illustrated in FIG. 4 is designed, so that masked areas $4'_i$ have, at mid-length, a reduced width with respect to their maximum width. The contour of these masked areas thus has two identical minimum widths at each end and a third minimum $7_{21}$, $7_{22}$, etc. at mid-length which is reduced with respect to the maximum width of the area.

To return to the etching mechanism described in connection with FIG. 1, in which this allowed for the existence of boundaries $2_i$ with determined constant width, for example 5 μm, in the plane of the plate: it is understood that if one prolongs the etching time beyond the time allowing one to preserve these boundaries, they will be progressively etched from the surface of the plate. The boundaries will then become recessed.

In the cross section illustrated in FIG. 5, it appears that the etching of the metal separating two cells begins in the middle part of the masked areas, because their width has a minimum value. It is understood that it is possible to establish in this way a common boundary $2'_1$, $2'_3$, which is lowered with respect to plane 6 of the starting surface of the plate, the profile of this boundary rising progressively as one moves toward the corner of each cell, where the reduction in the etching speed is fought against by outgrowths of the unmasked areas, as in the embodiment of FIG. 1. Curved profiles $2'_1$, $2'_3$ of the boundaries thus obtained improve the sphericity of the microlenses obtained via molding (e.g. pressmolding).

It is understood that the invention allows one indeed to accomplish the established aims by anticipation of the effects of the etching composition on the final form of the cells, anticipation which leads one to diverge from the forms conventionally given to the masks through which the etching is done.

Of course, the invention is not limited to the embodiments described and represented, which were only given as an example. For example, it would be possible to implement the invention using a plate other than a metallic plate, made of a ceramic, for example, provided that a suitable etching composition is used.

What is claimed is:

1. A method of making a mold for making microlens arrays, comprising:

selectively masking an area of a substrate to form an unmasked area having a generally polygonal opening that has substantially rectilinear sides which join in corner outgrowth portions and preferentially etching said substrate in said unmasked area to arrive at a final mold cell shape, whereby said mold cell shape is different from the shape of said unmasked area.

2. The method of claim 1, wherein said preferentially etching step comprises applying a mask onto said substrate, said mask having the shape of a grid with generally polygonal openings, each opening defined by a portion of the mask having substantially rectilinear side areas which are joined at corners, each opening centered over one of the desired cells to be hollowed in the plate by etching, and the generally rectilinear sides areas have outgrowth portions which extend towards the center of the desired cell, and exposing said substrate to a solution which is sufficient to etch the substrate.

3. The method of claim 2, wherein said preferentially etching step comprises using a mask which comprises corner openings in said unmasked areas having a radius of curvature (r).

4. The method of claim 3, wherein said preferentially etching step comprises using a mask whose corner opening radius of curvature (r) is approximately 1 μm.

5. The method of claim 3, wherein the ratio of the average radius of curvature (R) of the outgrowth portion to the width (I) of a cell is approximately between 0.25 and 0.5 for cells whose width is approximately between 20 and 100 μm.

6. The method of claim 2, wherein the unmasked areas ($3_i$) are separated from one another by masked areas ($4_i$), each having an axial symmetry around one of the sides of the polygons of a network of adjacent polygons, the width of these masked areas ($4_i$) being maximum at mid-length of these sides.

7. The method of claim 6, wherein the mask in areas adjacent to desired corners of cells is less than or equal to about ⅔ the maximum width of the mask.

8. The method of claim 2, wherein said exposing step comprises etching the substrate until the cells are defined by boundary walls having a substantially constant width.

9. The method of claim 2, wherein said exposing step comprises etching the substrate until the boundaries between cells are recessed below the top surface of the substrate.

10. The method of claim 9, wherein the mask in said preferentially etching step comprises unmasked areas ($3_i$) which are separated from one another by masked areas ($4_i$) whose width changes progressively between two substantially identical minima located at their ends and a third minimum ($7_{ij}$) located at mid-length.

\* \* \* \* \*